United States Patent Office 3,306,741
Patented Feb. 28, 1967

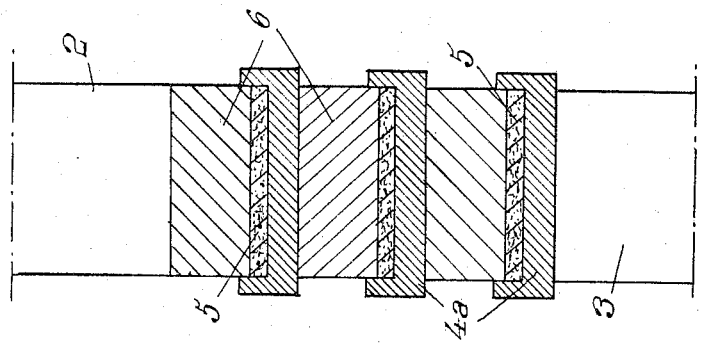
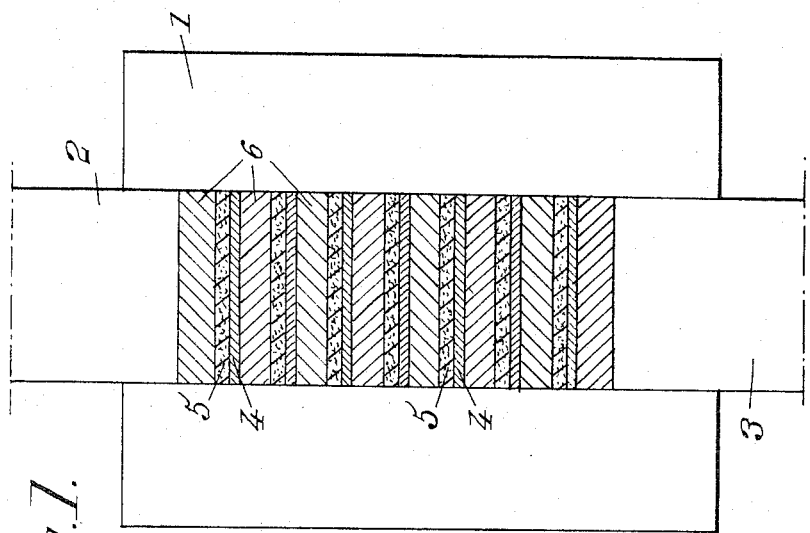

3,306,741
FRICTION LININGS AND PROCESSES FOR THE PRODUCTION OF SUCH LININGS
Pierre Martin Joseph Lallemant, Port-Marly, France, assignor to Societe Hispano-Suiza Lallemant, Bois-Colombes, Seine, France
Filed June 21, 1965, Ser. No. 465,696
Claims priority, application France, Sept. 12, 1962, 909,295; July 31, 1963, 943,374
10 Claims. (Cl. 75—204)

The present inventinon is a continuation-in-part of my application Ser. No. 307,254, filed September 6, 1963, for "Improvements in Friction Linings and Processes for the Production of Such Linings," and now abandoned.

This invention relates to friction linings of the type used for apparatus such as brakes and clutches, and to processes for the production of such linings, more especially, but not exclusively, for aircraft brakes.

It is an object of the present invention to provide improvements in said processes and linings.

According to the present invention linings of the above type are constituted by a sintered material obtained from a powder containing at least boron carbide and preferably also cobalt and/or chromium and/or nickel, the sintering being carried out in a protective atmosphere capable of preventing the decomposition of the boron carbide under the effect of heat, more particularly in a rarefied or carburising atmosphere.

Friction inserts may be fitted to a metallic support, the permanent support of the friction insert being arranged in such a manner that it constitutes part at least of the mould necessary for the production of the said insert by sintering, the latter being rendered fast with the said support during the course of the sintering operation.

The invention is illustrated by way of example in the accompanying drawings, in which:

FIGURES 1 and 2 show diagrammatically and in vertical sectional view two embodiments of an apparatus for the sintering of friction inserts according to the invention.

To produce friction linings for brakes, for example for aircraft brakes, the following or a similar procedure is adopted.

This lining is constituted in a manner known per se by a sintered material obtained from a powder, the said material preferably being given its final form during the sintering operation, which form may be for example, as will be assumed hereinafter, that of inserts intended to be fixed on metallic supports which themselves are intended to be fitted on a brake disc.

For the production of the said lining a powder is used containing at least boron carbide and preferably also cobalt and/or chromium and/or nickel, and the sintering operation is carried out in a protective atmosphere capable of preventing the decomposition of the boron carbide under the effect of heat.

The relative proportions of the constituents of the mixture of powders intended to be sintered advantageously have the following limits relative to the total weight of the mixture:

| | Precent |
|---|---|
| Boron carbide | 5 to 90 |
| Cobalt | 15 to 40 |
| Chromium | 5 to 15 |
| Nickel | 2 to 15 |

When the optional constituents (cobalt, chromium, nickel) are used simultaneously, they can be incorporated in the mixture in the form of a Stellite powder, the Stellites being alloys formed by means of such constituents.

Then, after sintering, under the effect of pressure and temperature, there is obtained a material composed of grains of boron carbide embedded and encased in a mass of sintered Stellite, such a material having a considerable energy, as well as satisfactory mechanical strength and a high co-efficient of friction, whilst being relatively constant to varying temperatures and speeds of use.

To promote the encasing of the grains of boron carbide by the Stellite powder it is advantageous to add to the mixture a binding agent such as for example paraffin oil, for example in a proportion of 1%. Preferably for the boron carbide powder a grain size is used between 0.1 mm. and 1 mm., and preferably between 0.1 mm. and 0.5 mm., and, for the Stellite powder a grain size of between 0.01 mm. and 0.1 mm. and preferably between 0.02 mm. and 0.04 mm.

A normal sintering temperature is used, preferably between 1000 and 1250° C., for example of about 1020 to 1050° C. The sintering time may be about half an hour and the pressures used from the rise in temperature, for example towards 500°, may vary from several hundred kg./cm.$^2$ (for example 400 kg./cm.$^2$) to several tons/cm.$^2$ (for example 8 tons/cm.$^2$).

The protective atmosphere in which sintering is to be carried out plays a vital part since any decomposition, even a partial decomposition, of the boron carbide would detrimentally affect the qualities of the finished product to a certain extent. This atmosphere can advantageously be constituted, by a rarefied atmosphere, for example by operating in a vacuum furnace having a pressure less than $10^{-1}$ atmospheres and preferably of about $10^{-4}$ to $10^{-5}$ atmospheres, or by a carburising atmosphere, for example an atmosphere containing more particularly $CO_2$ and CO; for this purpose it is possible to use for example an atmosphere formed of $CO_2$ (less than 1.5%), CO (20 to 25%), hydrogen (37 to 40%) and nitrogen (the remainder), or an atmosphere formed of $CO_2$ (4%), CO (75%), methane (8%) and hydrogen (the remainder).

I may also use as atmosphere for carrying my process a nitrogen atmosphere.

It is also possible in certain cases to incorporate with the material constituting the friction lining, preferably in the form of powder and before the sintering operation, one or more additives which are more particularly of a metallic or ceramic nature, the said additive or additives possibly fulfilling for example the function of an anti-jamming agent or a binding agent preventing the finished material from being too fragile.

Of these additives, it is possible to quote more particularly the following substances: tungsten, carbon, boron, silicon, iron, molybdenum, antimony, tin, graphite.

Six examples will now be given by way of indication illustrating the possible composition of a friction lining constructed according to the present invention.

*Example No. 1*

| | Percent by weight |
|---|---|
| Boron carbide | 25 |
| Cobalt | 37.5 |
| Chromium | 14.25 |
| Nickel | 9.75 |
| Tungsten | 6 |
| Carbon | 0.75 |
| Boron | 1.12 |
| Silicon | 1.87 |
| Iron | Remainder |

*Example No. 2*

| | |
|---|---|
| Boron carbide | 20 |
| Cobalt | 40 |
| Chromium | 12.1 |
| Nickel | 11.7 |
| Tungsten | 7.2 |

| | |
|---|---|
| Carbon | 0.9 |
| Boron | 1.35 |
| Silicon | 2.25 |
| Iron | Remainder |

*Example No. 3*

| | |
|---|---|
| Boron carbide | 34 |
| Cobalt | 36 |
| Chromium | 12.5 |
| Tungsten | 8 |
| Carbon | 1 |
| Boron | 1.5 |
| Silicon | 2.5 |
| Iron | Remainder |

*Example No. 4*

| | |
|---|---|
| Boron carbide | 6 |
| Cobalt | 40 |
| Chromium | 12.1 |
| Nickel | 11.7 |
| Molybdenum | 8 |
| Tungsten | 7.2 |
| Tin | 3.5 |
| Antimony | 2.5 |
| Graphite | 2.5 |
| Carbon | 0.9 |
| Boron | 1.35 |
| Silicon | 2.25 |
| Iron | Remainder |

*Example No. 5*

| | |
|---|---|
| Boron carbide | 45 |
| Cobalt | 25 |
| Nickel | 6.5 |
| Chromium | 9.5 |
| Molybdenum | 5 |
| Antimony | 4 |
| Carbon | 0.5 |
| Boron | 0.75 |
| Silicon | 1.25 |
| Iron | Remainder |

*Example No. 6*

| | |
|---|---|
| Boron carbide | 18 |
| Cobalt | 36 |
| Chromium | 12.5 |
| Tungsten | 8 |
| Graphite | 7 |
| Molybdenum | 5 |
| Tin | 3 |
| Silicon | 2.3 |
| Antimony | 2 |
| Boron | 1.5 |
| Carbon | 1 |
| Iron | Remainder |

Although it is possible to construct such sintered friction inserts and then fix them on a metallic support, for example by brazing, it seems preferable in the case of all sintered friction inserts which are to be fixed to a support, to arrange the said support in such a manner that it constitutes part at least of the mould necessary for the production of the corresponding insert by sintering, the said insert being then rendered fast with the said support during the course of the sintering operation itself.

For this purpose one of the two embodiments which will now be described more explicitly by way of example may be used.

In the embodiment shown in FIGURE 1, in which the metallic support acts merely as the bottom of the mould, a mould body 1 is used which has a bore whose diameter corresponds substantially to that of the inserts to be produced, the said bore serving as a guide for the piston 2 and the counter-piston 3, for example both made of graphite. In this bore there are stacked assemblies constituted each by a metallic washer 4, for example made of steel, surmouned by the mixture 5 of boron carbide and Stellite which is to form an insert, the said assemblies being separated by interposed washer 6 made for example of graphite.

Between each washer 4 and the corresponding mixture 5 there is preferably provided a layer of pure Stellite (not shown) intended to promote the welding of the insert to the said washer during the sintering operation.

In the embodiment illustrated in FIGURE 2, in which the metallic support acts as a complete mould, there are used instead of the washer 4 cups 4a which are also made for example of steel, and serve as a mould for the mixture 5 to be sintered, the upper edge of each cup being cut after sintering so as to finish substantially flush with the outer face of the insert, the said disc possibly being subjected to any desired machining operation permitting it to be fixed on a brake disc.

What I claim is:
1. A method of manufacturing a lining for brakes, clutches and the like, comprising the steps of:
 (a) forming a mixture consisting essentially of 30% to 90% by weight boron carbide powder and a powder of at least one metal selected from the group consisting of cobalt, chromium and nickel,
 (b) forming the mixture into the shape desired for the lining, and
 (c) sintering said mixture at a temperature of at most 1250° C. in a non-oxidizing atmosphere adapted to prevent decomposition of boron carbide under the action of heat.

2. A method of manufacturing a lining for brakes, clutches and the like, comprising the steps of:
 (a) forming a mixture consisting essentially of 5% to 90% by weight boron carbide powder, a powder of at least one metal selected from the group consisting of cobalt, chromium and nickel, and at least one additive selected from the group consisting of tungsten, boron, silicon, iron, molybdenum, tin, antimony and carbon,
 (b) forming the mixture into the shape desired for the lining, and
 (c) sintering said mixture at a temperature of at most 1250° C. in a non-oxidizing atmosphere adapted to prevent decomposition of boron carbide under the action of heat.

3. A process according to claim 2, wherein the particle size of the boron carbide powder is between 0.01 mm. and 1 mm.

4. A process according to claim 2 wherein the particle size of the boron carbide powder is between 0.1 mm. and 0.5 mm.

5. A process according to claim 2 wherein said powder consists essentially of cobalt, chromium and nickel introduced together in the form of a Stellite powder, the particle size of this powder being between 0.01 mm., and 0.1 mm.

6. A process according to claim 2, wherein said powder consists essentially of cobalt, chromium and nickel introduced together in the form of a Stellite powder, the particle size of this powder being between 0.02 mm. and 0.04 mm.

7. A method as claimed in claim 2 wherein said non-oxidizing atmosphere is a vacuum.

8. A method as claimed in claim 2 wherein the said non-oxidizing atmosphere is a carburizing atmosphere consisting essentially of $CO_2$ and $CO$.

9. A method as claimed in claim 2 wherein said non-oxidizing atmosphere is a nitrogen atmosphere.

10. A method of manufacturing a lining for brakes, clutches and the like comprising the steps of:
 (a) forming a mixture, a major portion of which is formed by (1) boron carbide in an amount equal to 5 to 90% of the mixture,
(2) at least one powder from the group consisting of cobalt, chromium and nickel, wherein said cobalt, when present, comprises 15 to 40% of the mixture, chromium, when present, comprises 5 to 15% of the mixture and nickel, when present, comprises 2 to 15% of the mixture,
(b) forming the mixture into the shape desired for the lining, and
(c) sintering said mixture at a temperature of at most 1250° C. in a non-oxidizing atmosphere adapted to prevent decomposition of boron carbide under the action of heat.

References Cited by the Examiner

UNITED STATES PATENTS 2,124,538  7/1938  Boyer _____ 75—204

OTHER REFERENCES

Abstract No. 3002, "Treatise on Powder Metallurgy," vol. III, Goetzel Interscience Publishers Co., New York, 1952, pages 213, 214.

"Refactory Hard Metals," Schwarzkopf, Macmillan Co., New York, 1953, page 412.

BENJAMIN R. PADGETT, *Acting Primary Examiner.*

R. L. GRUDZIECKI, *Assistant Examiner.*